(12) United States Patent
Hwang et al.

(10) Patent No.: US 8,125,631 B2
(45) Date of Patent: Feb. 28, 2012

(54) TESTER FOR TESTING OPTICAL DETECTOR

(75) Inventors: Induk Hwang, Suwon-si (KR); Jeonggun Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 12/435,701

(22) Filed: May 5, 2009

(65) Prior Publication Data

US 2010/0060886 A1   Mar. 11, 2010

(30) Foreign Application Priority Data

Sep. 10, 2008   (KR) .................. 10-2008-0089336

(51) Int. Cl.
*G01J 3/00* (2006.01)
(52) U.S. Cl. .................. 356/218; 356/213; 356/227

(58) Field of Classification Search .......... 356/213–226
See application file for complete search history.

(56) References Cited

U.S. PATENT DOCUMENTS

| 2006/0120514 A1* | 6/2006 | Joerger et al. ............ 378/207 |
| 2006/0256214 A1* | 11/2006 | MacLean et al. ............ 348/234 |
| 2008/0243419 A1* | 10/2008 | Nussbacher et al. ......... 702/117 |

FOREIGN PATENT DOCUMENTS

JP   2007-109594   *   4/2007

OTHER PUBLICATIONS 2007-537748, Apr. 2007, Derwent, Ichizawa.*

* cited by examiner

*Primary Examiner* — Hoa Pham
(74) *Attorney, Agent, or Firm* — Sughrue Mion, PLLC

(57) ABSTRACT

Provided is a tester for testing an optical detector. The tester includes a plurality of light emitting units which emit light beams to the optical detector, wherein the light beams have light intensities different from each other, and a power supply unit which supplies electric power to the plurality of light emitting units.

11 Claims, 4 Drawing Sheets

TESTER FOR TESTING OPTICAL DETECTOR

CROSS-REFERENCE TO RELATED APPLICATIONS

This application claims priority from Korean Patent Application No. 10-2008-0089336, filed on Sep. 10, 2008, in the Korean Intellectual Property Office, the disclosure of which is incorporated herein in its entirety by reference.

BACKGROUND

1. Field

Apparatuses consistent with the present invention relate to a tester for testing whether an optical detector that optically detects characteristics of biochemical samples operates normally.

2. Description of the Related Art

In microfluidics, microfluidic apparatuses generally include a chamber containing a small amount of fluid, a channel through which the fluid may flow, and a valve controlling the flow of the fluid. A bio-chip may perform tests including biochemical reactions on a small chip. In particular, when a lab-on-a-chip is used, a series of processes may be performed on a chip.

In order to convey the fluid in the microfluidic apparatus, a driving pressure is required. The driving pressure may be a capillary pressure or a pressure generated by an additional pump. Recently, in newly introduced disk type microfluidic apparatuses, the fluid is driven by centrifugal force generated by rotating the disk type microfluidic apparatus on which chambers and channels are arranged. The disc type microfluidic apparatus is referred to as a lab compact disc (CD) or a lab-on-a-CD.

Results of biochemical tests performed by the disc type microfluidic apparatus, for example, immunoassay test or deoxyribonucleic acid (DNA) test, may be detected using an optical detector. However, if the optical detector operates abnormally, the test results are not reliable. For example, when the optical detector cannot measure the intensity of light emitted from a certain chamber of the microfluidic apparatus, or the light intensity is not measured accurately, the test results are not reliable. However, since a test device to easily check the operating reliability of the optical detector has not been developed, checking the normal operation of the optical detector is time-consuming and expensive. On the other hand, when the test results are detected without testing the operation of the optical detector, the test results are not reliable.

SUMMARY

One or more embodiments of the present invention provide a tester for testing whether an optical detector that detects characteristics of biochemical samples in an optical method operates normally.

According to an aspect of the present invention, there is provided a tester for testing an optical detector, the tester including: a plurality of light emitting units irradiating light beams to the optical detector, wherein the light beams have different light intensities from each other; and a power supply unit supplying electric power to the plurality of light emitting units.

Each of the plurality of light emitting units may include a light source emitting light beam and a light density filter changing the light intensity of the emitted light beam, wherein the light sources in the plurality of light emitting units may emit light beams having the same light intensities and the light density filters have different light transmittance from each other.

Each of the light sources may include a light emitting diode (LED).

The tester may further include: a light intensity compensation unit maintaining constant the light intensities of the light beams emitted from the light sources.

The light intensity compensation unit may include: a plurality of optical sensors measuring the light intensity by receiving some of the light beams emitted from the light sources, wherein the optical sensors are in a one-to-one correspondence with the light sources; and a controller controlling the light beams emitted from the light sources based on the light intensities measured by the corresponding optical sensors.

Each of the optical sensors may include a photo diode.

Each of the light density filters may be disposed on a portion close to the corresponding light source, and each of the optical sensors may be disposed on a portion close to the corresponding light source and opposite the light density filter.

The tester may further include: a beam splitter transmitting a portion of the light emitted from the light sources to the optical sensors corresponding to the light beams, and reflecting other portion of the light emitted from the light source to the corresponding optical density filters.

The power supply unit may include a secondary battery that is rechargeable.

The tester may have a disk shape and may be mounted and rotated on a rotating unit, and the plurality of light emitting units may be separated at constant distances from a rotation center of the tester.

BRIEF DESCRIPTION OF THE DRAWINGS

The above and/or other aspects of the present invention will become apparent and more readily appreciated from the following description of exemplary embodiments, taken in conjunction with the accompanying drawings of which.

DETAILED DESCRIPTION OF THE EXEMPLARY EMBODIMENTS

Figure 1:
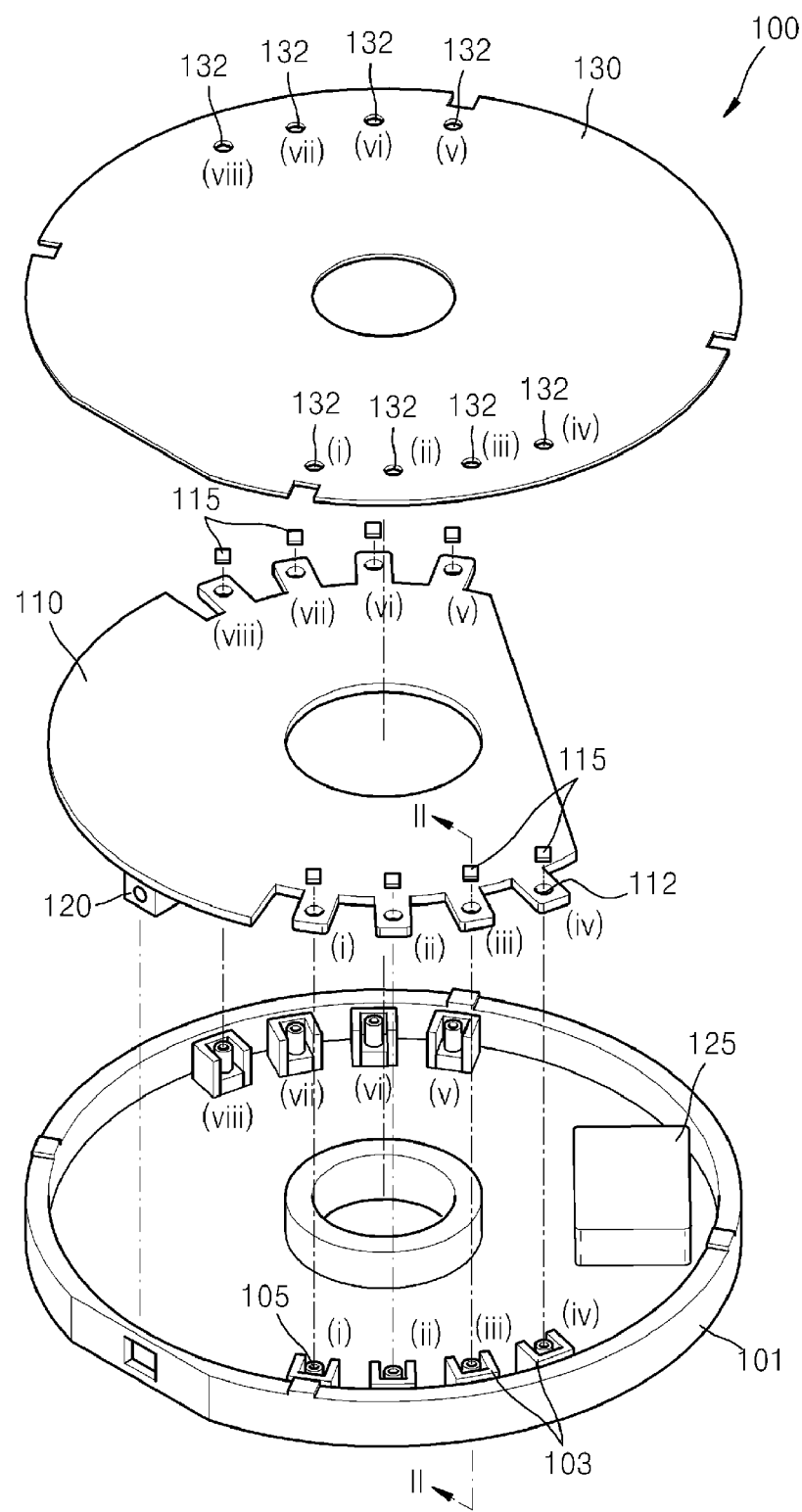
FIG. 1 is an exploded perspective view of a tester for an optical detector according to an exemplary embodiment of the present invention.

Reference will now be made in detail to exemplary embodiments, examples of which are illustrated in the accompanying drawings, wherein like reference numerals refer to the like elements throughout. In this regard, the present invention may be embodied in many different forms and should not be construed as being limited to the exemplary embodiments set forth herein. Accordingly, exemplary embodiments are merely described below, by referring to the figures, to explain aspects of the present invention.

Figure 2:
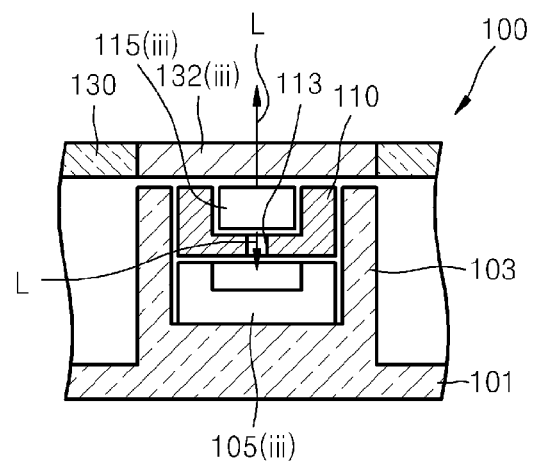
FIG. 2 is a cross-sectional view of the tester taken along line II-II of FIG. 1.
Figure 3:
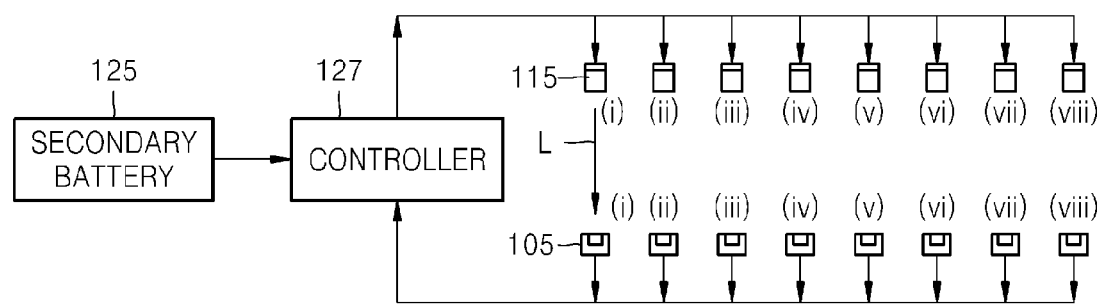
FIG. 3 is a block diagram showing a configuration for adjusting the intensity of light emitted from a light source in the tester for the optical detector shown in FIG. 1.

FIG. 1 is an exploded perspective view of a tester 100 for testing an optical detector according to an exemplary embodiment of the present invention, FIG. 2 is a cross-sectional view of the tester taken along line II-II of FIG. 1, and FIG. 3 is a block diagram showing a configuration for adjusting the intensity of light emitted from a light source in the tester for the optical detector shown in FIG. 1.

Referring to FIGS. 1 and 2, a tester 100 according to an exemplary embodiment of the present invention has a disk shape that corresponds to a disk type microfluidic apparatus (not shown), and includes a base 101 having an open upper portion, a cover 130 coupled to the base 101 to cover an inner space of the base 101, and a circuit board 110 disposed on the base 101. Eight light sources 115i-115viii are mounted in concave recesses 112 that are formed on an outer circumferential portion of the circuit board 110, and eight optical density filters 132i-132viii, which respectively correspond to the eight light sources 115i-115viii, are mounted in the cover 130.

Eight light emitting units, which irradiate light beams having different light intensities from each other to an optical detector 10 (refer to FIG. 5), include the eight light sources 115i-115viii and the eight light density filters 132i-132viii that respectively correspond to the light sources 115i-115viii and change the light intensities of the light beams emitted from the light sources 115i-115viii. The light emitting units are separated by constant distances from the rotation center of the disk-shaped tester 100. The light sources 115i-115viii emit light beams having the same light intensities as each other, and may include light emitting diodes (LEDs) of the same type.

Each of the light density filters 132i-132viii is disposed to respectively correspond to one of the light sources 115i-115viii and reduces the light intensity emitted from the corresponding light source. Each of the light density filters 132i-132viii may include a neutral density (ND) filter, for example. The eight light density filters 132i-132viii have different light transmittances from each other. Therefore, although the light sources 115i-115viii emit the light beams having the same light intensities as each other, the light intensities of the beams become different from each other after the beams transmit pass through the light density filters 132i-132viii. The eight light density filters 132i-132viii may be arranged in an order of linearly increased light transmittance, or in an order of linearly reduced light transmittance. For example, the light transmittance of the first light density filter 132i may be 10%, the light transmittance of the second light density filter 132ii may be 20%, the light transmittance of the third light density filter 132iii may be 30%, the light transmittance of the fourth light density filter 132iv may be 40%, the light transmittance of the fifth light density filter 132v may be 50%, the light transmittance of the sixth light density filter 132vi may be 60%, the light transmittance of the seventh light density filter 132vii may be 70%, and the light transmittance of the eighth light density filter 132viii may be 80%. Alternatively, the light density filters 132i-132viii may be arranged in an order opposite to the above order.

The tester 100 includes a power supply unit that supplies electric power to the eight light sources 115i-115viii. The power supply unit includes a secondary battery 125 that is rechargeable and a power supply port 120 to which an external power supply line (not shown) can be connected. The electrical energy provided to the tester 100 through the power supply port 120 is stored in the secondary battery 125. However, the power supply unit is not limited to the above example, and the power supply unit may include a primary battery that is disposable.

The tester 100 further includes a light intensity compensation unit that maintains constant the light intensities of the beams emitted from the light sources 115i-115viii. The light intensity compensation unit includes eight optical sensors 105i-105viii measuring light intensities by receiving some of the light L emitted from the light sources 115i-115viii. The optical sensors 105i-105viii correspond to the light sources 115i-115viii respectively, and are installed on mounting points surrounded by side walls 103 in the base 101.

Each of the optical sensors 105i-105viii is disposed directly under the corresponding one of the light sources 115i-115viii to measure the light intensity emitted from the corresponding light sources 115i-115viii. That is, the light density filters 132i-132viii are disposed directly above the corresponding light sources 115i-115viii, and the optical sensors 105i-105viii are disposed directly under the corresponding light sources 115i-115viii.

Since each of the concave recesses 112 in the circuit board 110, in which the light sources 115i-115viii are mounted, includes a light transmission hole 113, some of the light L emitted from the light sources 115i-115viii can be received by the corresponding optical sensors 105i-105viii. Each of the optical sensors 105i-105viii may include a photo diode.

Referring to FIG. 3, the light intensity compensation unit further includes a controller 127 that controls the light emitted from the light sources 115i-115viii based on the light intensity measurements of the optical sensors 105i-105viii. Although it is not explicitly shown in the drawings, the controller 127 can include electronic devices that are mounted on the circuit board 110 (refer to FIG. 1), for example, a processor or a memory, and a circuit electrically connecting the electronic devices. The controller 127 controls the light sources 115i-115viii so that the light sources 115i-115viii emit the light beams having the same constant light intensities. That is, when the light beams are emitted from the light sources 115i-115viii, the light intensities of the emitted light beams are measured using the corresponding optical sensors 105i-105viii regularly or at a discretionary point in time. After that, when the measured light intensity is not equal to the target light intensity, signal inputs to the defective light source 115i, . . . , or 115viii are appropriately adjusted to make the light intensity of the light L emitted from that light source 115i, . . . , or 115viii reach the target light intensity. The adjustment of the input signals may be magnitude, waveform, or current frequency adjustment.

Figure 4:
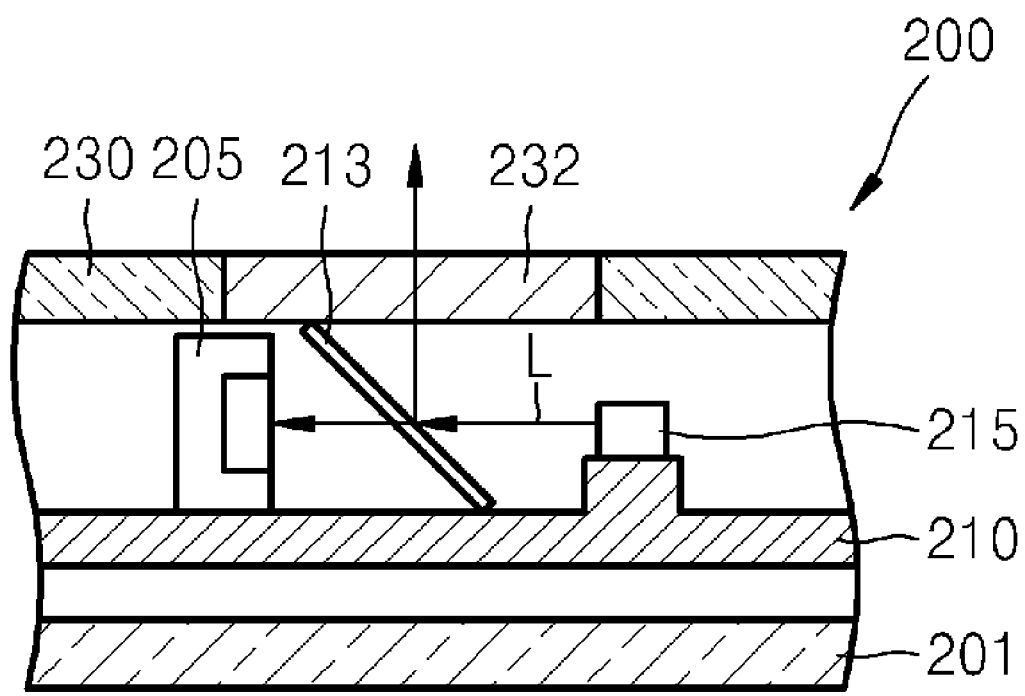
FIG. 4 is a cross-sectional view of a tester for an optical detector according to another exemplary embodiment of the present invention.

FIG. 4 shows a tester 200 according to another exemplary embodiment of the present invention. Referring to FIG. 4 the tester 200 of the present exemplary embodiment includes a beam splitter 213, which transmits some portion of the light L emitted from a light source 215 to an optical sensor 205 corresponding to the light source 215 and reflects other portion of the light L to a light density filter 232. Although FIG. 4 shows one light source 215, one optical sensor 205, one beam splitter 213 and one light density filter 232, the tester 200 includes a plurality of light sources 215, a plurality of optical sensors 205, and a plurality of beam splitter 213 mounted on a circuit board 210, which is disposed between a base 201 and a cover 230 coupled to the base 201. The light density filters 232, which are mounted in the cover 230, are disposed directly above the beam splitter 213.

Like the tester 100 shown in FIGS. 1 through 3, the base 201 and the cover 230 may be formed to have disk shapes, and the light sources 215, the optical sensors 205, and the light density filters 232 may be mounted to correspond to each other respectively. In addition, the optical sensors 205 and the light sources 215 may be electrically connected to the controller 127 (refer to FIG. 3), which maintains constant the light intensities of the light beams emitted from the light sources 215. Moreover, the beam splitters 213 may be formed to correspond to the light sources 215 respectively. In the present exemplary embodiment, the number of the light sources 215, optical sensors 205, light density filters 232, and beam splitters 213 is respectively eight, however, the present invention is not limited thereto.

Figure 5:
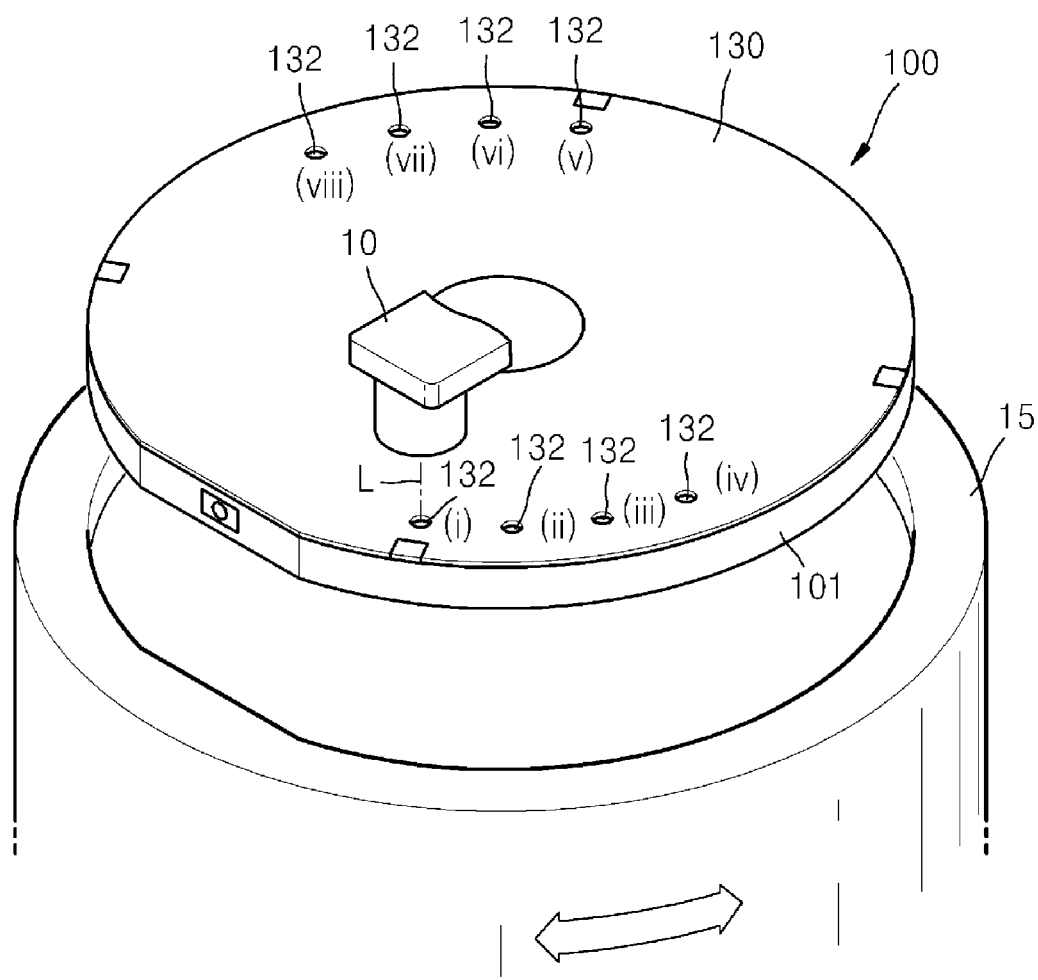
FIG. 5 is a perspective view showing an example of testing the optical detector using the tester shown in FIG. 1.

FIG. 5 is a perspective view showing an example of testing an optical detector using the tester 100 shown in FIG. 1.

Referring to FIG. 5, the tester 100 is mounted on a turntable 15 in order to test whether the optical detector operates normally, before executing biochemical tests, immunoassay tests, or DNA tests, when a microfluidic apparatus (not shown) of a disk shape is rotated on the turntable 15. The tester 100 is rotated by an appropriate angle in order to arrange the tester 100 so that the optical detector 10 can be located directly above the first light density filter 132$i$. In addition, the first light source 115$i$ is driven and the light intensity is measured using the optical detector 10. The second through eighth light sources 115$ii$-115$viii$ are sequentially driven in the same way as above, and then, the light intensities are sequentially measured using the optical detector 10. When the measured light intensity is not equal to the expected measurement value within a tolerable margin, it can be determined that the optical detector 10 is broken or operates abnormally. When the measured light intensity is equal to the expected measurement value within the tolerable margin, the results of the biochemical tests, immunoassay tests, or DNA tests executed using the optical detector 10 are reliable.

While aspects of the present invention have been particularly shown and described with reference to differing exemplary embodiments thereof, it should be understood that these exemplary embodiments should be considered in a descriptive sense only and not for purposes of limitation. Descriptions of features or aspects within each exemplary embodiment should typically be considered as available for other similar features or aspects in the remaining exemplary embodiments.

Thus, although a few exemplary embodiments have been shown and described, it would be appreciated by those of ordinary skill in the art that changes may be made in these exemplary embodiments without departing from the principles and spirit of the invention, the scope of which is defined in the claims and their equivalents.

What is claimed is:

1. A tester for testing an optical detector, the tester comprising:
   a plurality of light emitting units which irradiate light beams to the optical detector, wherein the light beams have light intensities different from each other;
   a power supply unit which supply electric power to the plurality of light emitting units; and
   a light intensity compensation unit which maintains the light intensities of the light beams emitted from the light sources at a constant level,
   wherein the light intensity compensation unit comprises a plurality of optical sensors which measure the light intensities by receiving some of the light beams emitted from the light sources, wherein the optical sensors are in a one-to-one correspondence with the light sources.

2. The tester of claim 1, wherein each of the plurality of light emitting units includes a light source which emits a light beam and a light density filter which changes a light intensity of the emitted light beam, wherein the light sources of the plurality of light emitting units emit light beams having the same light intensity and the light density filters have light transmittances different from each other.

3. The tester of claim 2, wherein each of the light sources includes a light emitting diode.

4. The tester of claim 2,
   wherein the optical sensors are in a one-to-one correspondence with the light sources, and
   wherein the light intensity compensation unit further comprises
   a controller which controls the light beams emitted from the light sources based on the light intensities measured by the corresponding optical sensors.

5. The tester of claim 4, wherein each of the optical sensors includes a photo diode.

6. The tester of claim 4, wherein the light density filters are disposed on a cover at positions corresponding to the light sources, and the optical sensors are disposed on a base a positions corresponding to the lights sources and opposite to the light density filters.

7. The tester of claim 4, further comprising:
   a plurality of beam splitters which transmit a portion of the light emitted from the light sources to the optical sensors corresponding to the light sources, and reflect another portion of the light emitted from the light sources to the corresponding optical density filters.

8. The tester of claim 1, wherein the power supply unit includes a secondary battery that is rechargeable.

9. The tester of claim 1, wherein the tester has a disk shape and is mounted on and rotated by a rotating unit, and the plurality of light emitting units are separated by constant distances from a rotation center of the tester.

10. The tester of claim 1, wherein the optical detector is configured to perform biochemical tests in a microfluidic apparatus.

11. The tester of claim 10, wherein the microfluidic apparatus comprises a lab-on-a-CD.

* * * * *